INVENTORS
JEROME P. HORWITZ
VAINUTIS K. VAITKEVICIUS
BY
Cameron, Kerkam + Sutton
ATTORNEYS

United States Patent Office 3,274,193
Patented Sept. 20, 1966

3,274,193
PURIN-6-YLTRIMETHYLAMMONIUM CHLORIDE AND PROCESSES OF MAKING IT
Jerome P. Horwitz, Oak Park, and Vainutis Vaitkevicius, Inkster, Mich., assignors to the United States of America as represented by the Secretary of Health, Education, and Welfare
Filed Nov. 26, 1962, Ser. No. 239,944
3 Claims. (Cl. 260—254)

This invention relates to a purine antimetabolite and to processes for making it.

More particularly this invention relates to purin-6-yltrimethylammonium chloride and to processes for synthesizing it from 6-chloropurine.

Heretofore, various purine derivatives have been synthesized and screened as potential antimetabolites but no purinyltrialkylammonium salt has ever been synthesized or proposed as an antimetabolite.

It is therefore the object of the present invention to provide a novel antimetabolite, purinyltrialkylammonium salt and more particularly purin-6-yltrimethylammonium chloride and processes for synthesizing this purine.

Figure 1:
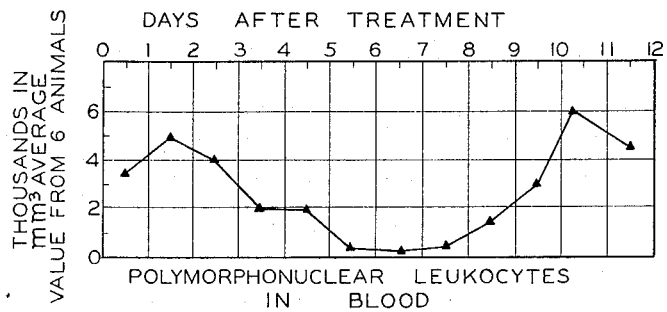
Figure 2:
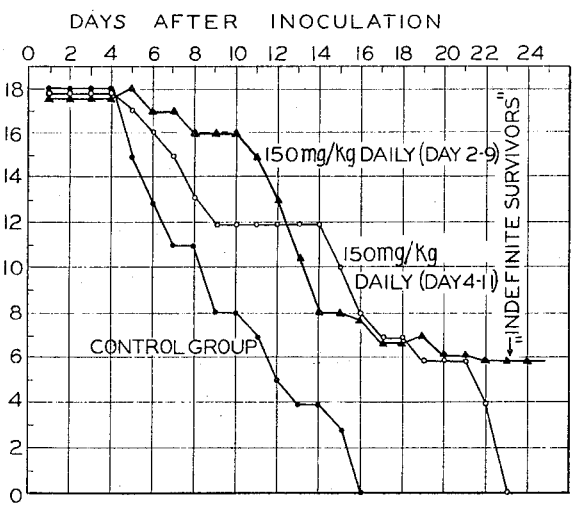
Figure 3:
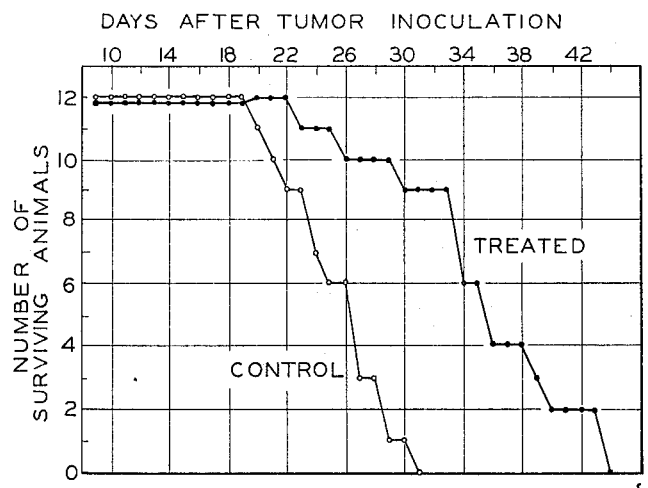

In the accompanying drawings, FIG. 1 is a graphic representation showing of white blood counts of surviving test animals;

FIG. 2 is a graphic representation showing the results of tumor inoculation in test animals; and FIG. 3 is a graphic representation showing a summary of survival of treated and untreated test animals.

We have found that 6-chloropurine can be transformed with 78% yield to purin-6-yltrimethylammonium chloride having the formula:

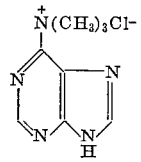

This purine is obtained by treatment of 6-chloropurine with trimethylamine in N,N-dimethylformamide and has been found to have a melting point of approximately 179–180° C. but higher melting points have been obtained as will appear hereinafter.

In a preferred synthesis in accordance with the present concept, into a solution of 6.18 grams (0.04 mole) of 6-chloropurine in 50 milliliters of N,N-dimethylformamide (DMF) was bubbled 8.0 grams (0.135 mole) of trimethylamine. The solution, on cooling, deposited a solid which was collected after allowing the mixture to stand overnight at room temperature. The product was washed first with DMF and then several times with ether; weight 6.66 g. (79% yield), melting point 165–166° (decomposition). Successive recrystallizations from absolute ethanol and methanol provided an analytical sample, melting point 179–180° dec.

*Elementary analysis.*—Calcd. for $C_8H_{12}N_5Cl$: carbon, 44.97; hydrogen, 5.66; nitrogen, 32.78. Found: carbon, 44.96; hydrogen, 5.83; nitrogen, 32.99.

After it had been demonstrated that purin-6-yltrimethylammonium chloride possessed interesting antimetabolic activity, a pharmaceutical house was authorized to prepare 300 grams of the material for additional biological studies. The pharmaceutical house noted that recrystallization of the reaction product from acetone-water afforded a solid of somewhat high melting point (189–191°) than that previously recorded. Nevertheless, the two solids showed identical chemical analyses.

Further investigation at Cancer Chemotherapy National Service Center subsequently elevated the melting point to 206–208° but again reported an analysis identical with that described above.

Purin-6-yltrimethylammonium chloride is useful as an antimetabolite.

The toxicity and the effect of this purine on transplantable mouse tumor is now described.

*Acute toxicity in mice.*—The $LD_{50}$ was determined in 6 months old $A_f$/Sp. mice. Two equal doses dissolved in sterile saline were administered intraperitoneally 6 hrs. apart. The volume of the solution was 0.5 ml. at each injection. The acute $LD_{50}$ was 500 mg./kg. All animals died within 12 hrs. after the second injection. Liver, kidney, spleen, lungs, bone marrow and proximal jejunum were examined histologically in each animal. In all animals central portions of the liver lobules showed hyperemia and small areas of necrosis. No mitotic figures could be seen in the crypts of Lieberkühn. Other organs showed no abnormalities. Daily white blood counts in surviving animals showed a moderate drop in neutrophils (FIG. 1).

*Chronic toxicity.*—Six mice were treated with 150 mg./kg. The compound was administered intraperitoneally daily in 0.5 ml. of sterile saline. All treated animals died between the 18th and 25th day of treatment. Before death all animals developed diarrhea. White blood counts, obtained every three days from a tail wound, showed disappearance of circulating neutrophils by the 15th day of treatment. Histological examinations showed aplastic bone marrow in all animals, focal hemorrhagic enteritis in 5 animals and lung abscesses in 2 animals.

*Effect on Ehrlich ascites tubor.*—Two groups of eighteen 6-months-old Ehrlich ascites tumor carrying male $A_f$/Sp. mice were treated intraperitoneally daily for one week with 150 mg. purin-6-yltrimethylammonium chloride. One group of animals was started on treatment four days after intraperitoneal injection of 0.2 ml. of non-hemorrhagic ascites containing 4 million tumor cells. The treatment of the second group was started the day after the tumor inoculation. Equal numbers of tumor-inoculated mice of the same strain, age, and sex served as controls. The results are summarized in FIG. 2. All animals in the control group had large amounts of ascites at death as did the animals dying between 5 and 9 days after tumor inoculation in the treated groups. Only two of the animals dying later in each of the treated groups had recognizable ascites at autopsy. In the second group there were 6 indefinite "survivors" which were observed for 2 months after the experiment was terminated.

*Effect on transplantable epidermoid carcinoma DC5.*—Twelve 6-months-old DC5 tumor bearing female MA/Sp. mice were treated with 150 mg./kg. purin-6-yltrimethylammonium chloride daily intraperitoneally for one week. A fragment of DC5 carcinoma was implanted under sterile conditions with a trocar into the left axilla 10 days before treatment was started. Equal numbers of animals served as controls.

| Daily dose (mg./kg.) | Survivors | Response-Test/Control (T/C) | | Percent (T/C) |
|---|---|---|---|---|
| | | Animal weight change (g.) | Tumor weight (mg.) | |
| 165.00 | 06/10 | 01.7/04.4 | 10/1,478.0 | -------- |
| 160.00 | 07/10 | 00.2/02.7 | 39.0/1,716.0 | 02 |
| 80.00 | 08/10 | −00.6/02.7 | 56.0/1,716.0 | 03 |
| 40.00 | 10/10 | 00.3/02.7 | 67.0/1,716.0 | 03 |
| 20.00 | 09/10 | 00.2/02.7 | 94.0/1,716.0 | 05 |
| 20.00 | 04/10 | −00.3/01.4 | 0.0/1,499.0 | -------- |
| 10.00 | 08/10 | −00.4/01.4 | 22.0/1,499.0 | 01 |
| 5.00 | 08/10 | 00.3/01.4 | 338.0/1,499.0 | 22 |

At the start of treatment tumors ranged from 2 to 5 mm. in diameter. The growth of the tumor was progressive in all control animals during the duration of the experiment.

In all treated animals the tumor decreased in size by the time treatment was stopped and was not palpable in two animals. However, 5 days later it became apparent that the tumor had resumed its growth in all animals. The survival of the treated and untreated animals is summarized in FIG. 3.

To obtain further data, the compound was submitted to the Cancer Chemotherapy National Service Center for routine screening. The compound had no effect against transplantable sarcoma 180 or against leukemia 1210. However, it was effective against carcinoma 755. The dose response curve is summarized in the table.

It should now be apparent that the present invention provides a novel antimetabolite, purin-6-yltrimethylammonium chloride and processes for producing it.

Changes in the described synthesis to obtain this purine may now be suggested to those skilled in the art without departing from the present inventive concept. Reference should therefore be had to the appended claims to determine the scope of this invention.

What is claimed is:
1. Purin-6-yltrimethylammonium chloride.
2. In a process for synthesizing purin-6-yltrimethylammonium chloride, the steps of preparing a solution of 6-chloropurine in N,N-dimethylformamide, bubbling trimethylamine through this solution, cooling the solution at room temperature, removing the solid precipitate from the cooled solution and then washing the removed precipitate with N,N-dimethylformamide and then with ether.
3. A process as described in claim 2 in which the solution comprises 6.18 grams of 6-chloropurine in 50 milliliters of N,N-dimethylformamide and in which 8.0 grams of trimethylamine was bubbled through the solution.

References Cited by the Examiner
UNITED STATES PATENTS 2,691,654  10/1954  Hitchings et al. _____ 260—252

OTHER REFERENCES

Montgomery et al.: Journal American Chem. Society, vol. 80, pages 404–408 (1958).

ALEX MAZEL, *Primary Examiner.*

NICHOLAS S. RIZZO, HENRY R. JILES, *Examiners.*

J. W. ADAMS, *Assistant Examiner.*